UNITED STATES PATENT OFFICE.

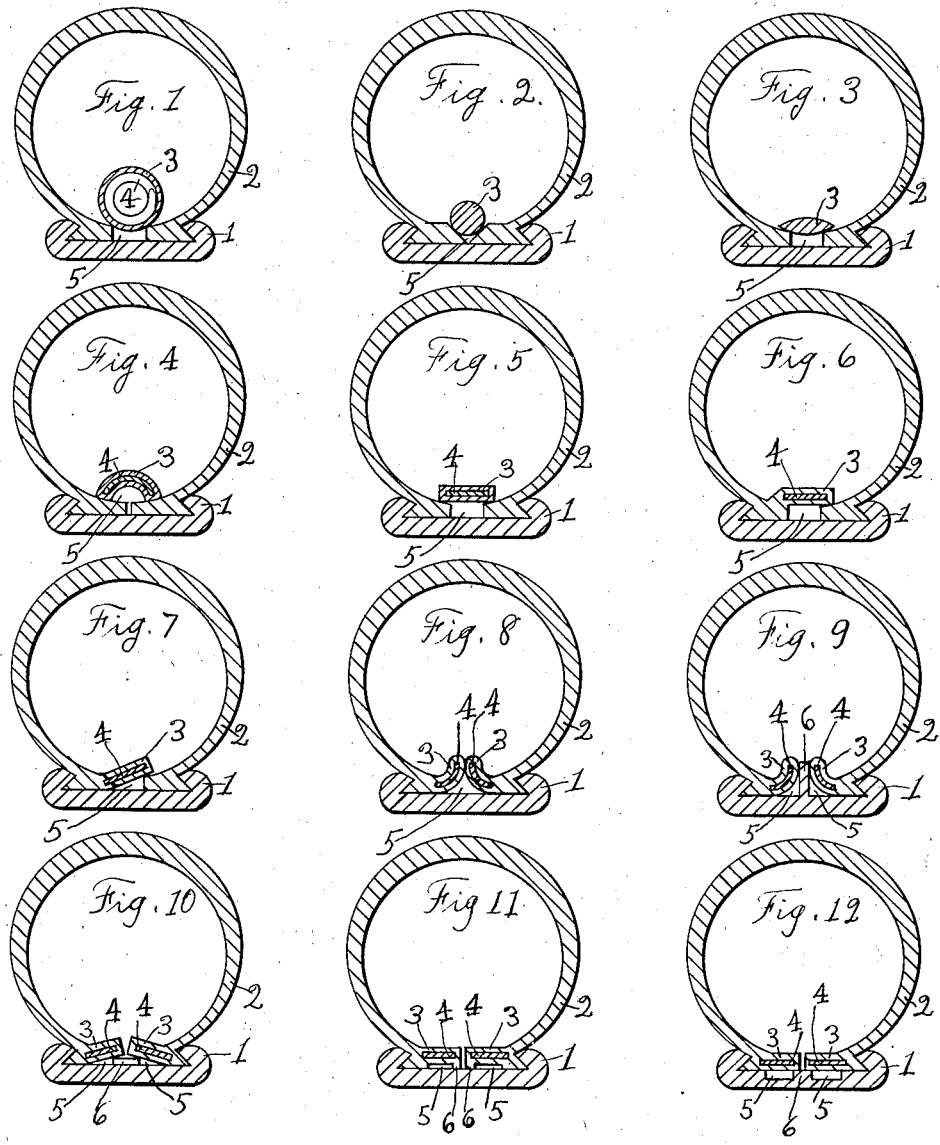

NATHANIEL BALDWIN, OF EAST MILL CREEK, UTAH.

PNEUMATIC TIRE.

1,389,024.  Specification of Letters Patent.  Patented Aug. 30, 1921.

Application filed October 22, 1919. Serial No. 332,378.

*To all whom it may concern:*

Be it known that I, NATHANIEL BALDWIN, a citizen of the United States, and a resident of East Mill Creek, in the county of Salt Lake and the State of Utah, have invented new and useful Improvements in Pneumatic Tires, of which the following is a specification.

My invention pertains to pneumatic tires without inner tubes and the object is to provide a tire similar to the ordinary casing and simple means to seal the tire airtight and thus avoid the necessity of an inner tube. Having means provided to seal the casing airtight the casing may be rubberized internally or treated with any desired leak-proof mixture or solution. In case repairs have to be made the casing may be removed, opened and repaired and quickly replaced as before.

I attain this object by any of the constructions illustrated in the accompanying drawing in which Figure 1 is a cross section of a wheel rim, tire and sealing device. Figs. 2, 3, 4, 5, 6, 7, 8, 9, 10, 11, and 12 represent cross sections of some of the forms in which the essentials of the invention may be embodied. Figs. 13 and 14 represent forms of reinforcing material.

In the several figures of the drawing numeral 1 designates the wheel rim, numeral 2 designates the tire, numeral 3 designates the sealing device, numeral 4 designates reinforcing or stiffening material which the sealing device may contain and numeral 5 designates a gap or space beneath the sealing device or on the side of the sealing device opposite the compressed air within the tire.

In Fig. 1 the edges of the tire are made thick and are so formed that a space or gap 5 is left between them. This gap is bridged by a sealing device consisting of a closely wound spiral spring 4, covered by a layer of some soft and impervious substance 3 such as rubber. When these parts are placed in position upon the rim 1 the tension of the spiral spring 4 will bring the sealing device into contact with the edges of the tire 2; and when the tire is inflated the air pressure upon the sealing device will cause it to press harder upon the edges of the tire. The space 5 must have a vent to the open air through the rim 1 or otherwise. (Not shown.) Since the area of the contact surface between the sealing device and the tire is small compared with the effective area of air pressure upon the sealing device, the contact pressure per square inch will greatly exceed the air pressure within the tire. The result will be to seal the tire against the escape of compressed air within. The tire is sealed on the same principle as the ordinary fruit jar.

The tire and sealing device may take a variety of forms all embodying the same invention. A number of examples are illustrated.

In Fig. 2 the edges of the tire are beveled so that the sealing device 3 rests upon slanting surfaces and wedges between them under the pressure of inflation. The illustration shows also a sealing device made of solid material such as rubber.

The sealing device need not be round but may have any other convenient shape such as that shown in Fig. 3. In Fig. 4 the sealing device takes the form of an arch with its edges resting on the edges of the tire and the space 5 is within the arch. In Fig. 5 the gap 5 is bridged by a flat sealing device and in Fig. 6 the arrangement is the same except that the sealing device is formed integral with one edge of the tire. In Fig. 7 the arrangement is the same as that of Fig. 6 except that the sealing device forms an extension of one edge of the tire and when placed upon the other edge of the tire takes an inclined position leaving a triangular space 5 as illustrated. In Fig. 8 both edges, 3, 3, of the tire are made wider and turned inward leaving a space 5 between and beneath them. The pressure of inflation will bring these edges into forcible contact and seal the tire.

The arrangement in Fig. 9 is the same as that of Fig. 8 except that a collar 6 formed in the middle of the rim fits in between the edges 3, 3, of the tire.

In Fig. 10 a collar 6 is also formed upon the middle portion of the rim but it is not so high and the edges 3, 3, of the tire rest upon it.

In Fig. 11 the edges 3, 3, of the tire rest upon the rim. Grooves 5, 5, formed in the under surfaces of the tire leave projecting edges 6, 6, which press upon the rim and effect the sealing.

In Fig. 12 the arrangement is the same as that of Fig. 11 except that the grooves 5, 5, are made in the rim and not in the tire.

It will be seen that in all these forms of tires and seals the sealing is accomplished on the same principle and by similar means: namely, that seals formed integral with tires or separate therefrom have vented spaces beneath them or between the seals and the rims, and that the edges of the seals sustain the entire pressure upon the seals. The high pressure thus obtained between the surfaces of contact effect the sealing of the tires. In each case the seals 3 which need to have a pliable surface may be stiffened or reinforced by some strong material 4. Reinforcing material suitable for most of these forms of seals may be made from a strip of sheet metal cut alternately on opposite sides as illustrated in Fig. 13. The strip of metal being cut in this manner will provide the necessary reinforcement for a seal and at the same time will be flexible and elastic and will cause the seal to adjust itself in a manner similar to that of the coiled spring of Fig. 1. Another form of reinforcing material may be made by bending a wire back and forth upon itself as illustrated in Fig. 14.

I claim:

1. A pneumatic tire comprising an endless tube divided on its inner circumference and separated leaving a gap between its edges and a sealing device within said endless tube and bridging said gap, said sealing device comprising a band of pliable material reinforced by stiff material to prevent said sealing device being pressed into said gap.

2. A pneumatic tire comprising an endless tube divided on its inner circumference and separated leaving a gap between its edges, and a sealing device within said endless tube and bridging said gap, said sealing device comprising a band of pliable material reinforced by a band of stiff material.

3. A pneumatic tire comprising an endless tube divided on its inner circumference and separated leaving a gap between its edges, and a sealing device within said endless tube and bridging said gap, said sealing device comprising a band of pliable material and a spiral spring.

4. A pneumatic tire comprising an endless tube divided on its inner circumference and separated leaving a gap between its edges, and a sealing device within said endless tube and bridging said gap, said sealing device comprising a spiral spring band and a pliable covering for said band.

NATHANIEL BALDWIN.